United States Patent
Yee

(10) Patent No.: US 6,889,337 B1
(45) Date of Patent: May 3, 2005

(54) METHOD AND SYSTEM FOR SCREEN READER REGRESSION TESTING

(75) Inventor: David Yee, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 503 days.

(21) Appl. No.: 10/161,826

(22) Filed: Jun. 3, 2002

(51) Int. Cl.[7] .............................................. G06F 11/00
(52) U.S. Cl. ........................... 714/1; 714/38; 434/116; 715/729; 717/124; 704/271
(58) Field of Search .............................. 714/1, 38, 824; 715/729, 746, 714, 727, 978; 704/271, 270, 260; 717/124; 434/116, 112

(56) References Cited

U.S. PATENT DOCUMENTS

| | | | |
|---|---|---|---|
| 6,694,509 B1 * | 2/2004 | Stoval et al. | 717/124 |
| 2004/0015862 A1 * | 1/2004 | Dunn | 717/124 |
| 2004/0145607 A1 * | 7/2004 | Alderson | 345/746 |

OTHER PUBLICATIONS

Raman, T.V., Emacspeak—A Speech Interface, Conference on Human Factors in Computing Systems, Vancouver, British Columbia, Canada, pp: 66–71, Year of Publication: 1996.*

Edwards, W.K., Providing Access to Graphical User Interfaces—Not Graphical Screens ACM Sigcaph Conference on Assistive Technologies, Proceedings of the first annual ACM conference on Assistive technologies, Marina Del Rey, California, United States.*

Ford, Sara, Sara Ford's WebLog, http://blogs.msdn.com/saraford/archive/2004/08/20/218078.aspx.*

Ford, Sara, Testing for Accessibility, Mar. 20004, Microsoft Corporation, http://msdn.microsoft.com/library/default.asp?url=/library/en-us/dnacc/html/accessibility_testing.asp.*

Speech output testing, Oct. 20, 2004, Web Access Centre, 1995–2004 Royal National Institute of the Blind, http://www.rnib.org.uk/xpedio/groups/public/documents/PublicWebsite/public_speechoutputtesting.hcsp.*

* cited by examiner

*Primary Examiner*—Robert Beausoliel
*Assistant Examiner*—Christopher McCarthy
(74) *Attorney, Agent, or Firm*—Wagner, Murabito, & Hao LLP

(57) ABSTRACT

A method for repeatable application testing on a computer system for audible output generated by the application in conjunction with a screen reader or similar assistive technology. The method includes recording user inputs to a user application using a test input component. The user inputs are also accessed by a screen reader input component. Outputs of the user application are recorded using a test output component. The outputs of the user application are also accessed by a screen reader output component. The resulting screen reader outputs are recorded and are analyzed with respect to the recorded user inputs and the recorded outputs of the user application. The user inputs to the user application can be keyboard inputs or mouse inputs, and inputs of other input devices. The outputs of the user application can be graphical outputs or alphanumeric outputs for a display of the computer system. The resulting screen reader outputs can be sound output signals (or representations thereof) for a sound system of the computer system.

20 Claims, 4 Drawing Sheets

METHOD AND SYSTEM FOR SCREEN READER REGRESSION TESTING

FIELD OF THE INVENTION

The field of the present invention pertains to the testing of software applications developed to assist viewing impaired persons use computer system technology. More particularly, the present invention relates to a method and system for efficiently testing applications that interact with a screen reader.

BACKGROUND OF THE INVENTION

Normal quality testing procedures for software applications involve execution of regression tests. Regression tests represent a set of tests that are executed with each release of a product, often multiple times prior to product release. These tests typically are automated for efficiency. Results of the tests are saved in files on the disk. An initial set of these files is manually inspected (e.g., by quality assurance personnel) for accuracy and form a "baseline" set of results. Subsequent runs of tests are executed and generate another set of results. The new set of results is compared against the baseline to ensure that product functionality is as expected and that no functionality has regressed.

When automated, a regression test typically is a set of instructions either written or recorded for later playback. A handwritten test may be a sequence of instructions in a format that is suitable to the product being tested, such as a set of command-line scripts, or a file fed into a product. A recorded script may be a sequence of keystrokes or mouse movements recorded by a software application specifically designed for such a purpose (e.g., products such as Segue Silk or Mercury WinRunner). Such recorded scripts may be hand-edited to provide for the introduction of variables to simplify multiple test runs with different data. Recorded tests are played back later, and thereby generate output files. The objective is to test the software application to correct any flaws or errors which may be present.

A screen reader is a software application or component that executes on a computer system. A screen reader is provided primarily for those persons who are blind or who have low vision (typically defined as 20/70 vision or worse). Although the term "screen reader" suggests a software program that actually "reads" a computer display, a screen reader does not read characters or text displayed on a computer monitor, but rather interacts with the display engine of a computer or directly with applications to determine what is to be spoken to a user (e.g., via the computer system's speakers).

An example of a screen reader is the JAWS product from Freedom Scientific. It inserts itself as a "display driver". At that level of the operating system software, it can inspect interaction occurring between the user and the computer, and has access to any information being drawn to the screen. This information is provided by a software application as the software application makes calls to the Operating System. Separately, a screen reader can inspect which windows are currently active, and interrogate them to know what its current active elements are and how they are associated.

With this information, a screen reader determines what is to be spoken to a user. For example, when it sees that a window of an application gains focus, it can announce the window's title. When it sees that a user tabs into a text field in the application, it can indicate audibly to the user that the text field is the center of focus, plus speak an associated label for that text field. A screen reader also has a text-to-speech converter. It can determine what text needs to be spoken, submit it to its text-to-speech converter, and cause audible words to be generated from the computer's audio/speaker system.

Screen readers also interact with Braille displays. A Braille display is a peripheral device that can be attached to a computer (typically a personal computer/PC via its serial port). The Braille display presents a set of lifted pins. This set of pins represents a line of characters that a sighted user would see on the screen at the current point of focus.

A Braille display provides input devices for moving the focus on the computer, typically allowing a user to scroll through or across a larger information set, since the display itself is limited to a small number of characters and lines. For example, a 1 line high×40 character wide Braille display only captures a small portion of a typical 24×80 terminal window, and one such window is a small portion of what a sighted user can see on a high resolution computer screen.

The characters on a Braille display represent characters that can be represented on a computer keyboard, including alphanumerics, upper and lower case, and punctuation. There also is a pin representation for the current text insertion point, which corresponds to what sighted users would see as a blinking cursor. Braille displays are "driven" by a screen reader or similar technology that knows what commands to send such that the display shows the right text and the right cursor position.

Thus, applications that interact with screen readers comprise sophisticated software programming that must be updated periodically to accommodate new features, new computer system hardware, new user requirements, and the like. In addition to updates, applications often have flaws or bugs which must be fixed with successive product releases. Thus there exists great interest in applying software test methodologies to applications in an environment that includes screen readers.

The need for an efficient test system for applications interacting with screen reading technology also stems from recent government demands to provide software the is coded to Section 508 standards. In 1973, the United States legislature passed the Workforce Rehabilitation Act. On Aug. 7, 1998, an amendment to the workforce rehabilitation act, commonly referred to as "Section 508", was signed into law by President Clinton. Section 508 requires that electronic and information technology developed or purchased by the Federal Government be accessible to people with disabilities. Section 508 establishes both non-binding guidelines for technology accessibility and binding, enforceable standards that will be incorporated into the Federal Procurement procedures. In addition to providing for enforceable standards, the amended Section 508 establishes a complaint procedure and reporting requirements to encourage compliance.

While software products can be coded to meet Section 508 standards, it is currently a time consuming, manual and audible process to test that an application is functional using a screen reader. The manual part of repeating such a test can be recorded through prior art regression testing software as described above, but playback would yield audible results that would need human interpretation and verification over time. Because of this, regression testing of large scale screen reader applications becomes untenable, causing high organizational cost.

Thus, what is required is an automated regression testing system that can function with applications and screen reader software. Additionally, what is required is an automated regression testing system compatible with the audible results of a screen reader. The present invention provides a novel solution to the above requirements.

SUMMARY OF THE INVENTION

Embodiments of the present invention comprise a method and system for automated screen reader regression testing. Embodiments of the present invention are configured to function with screen reader software. Additionally, embodiments of the present invention are configured to implement an automated screen reader regression testing system compatible with the audible results of a screen reader.

In one embodiment, the present invention is implemented as a method for application testing including a screen reader on a computer system. The method includes recording user inputs to a user application using a test input component. The user inputs are also accessed by a screen reader input component. Outputs of the user application are recorded using a test output component. The outputs of the user application are also accessed by a screen reader output component. The resulting screen reader outputs are recorded and are analyzed with respect to the recorded user inputs and the recorded outputs of the user application. The user inputs to the user application can be keyboard inputs or mouse inputs. The outputs of the user application can be graphical outputs or alphanumeric outputs for a display (e.g., monitor displays, Braille displays, etc.) or of the computer system. The resulting screen reader outputs can be sound output signals for a sound system of the computer system.

In this manner, embodiments of the present invention allow the recording of test scripts (e.g., using the test input component) in a natural way for existing Quality Assurance engineers. The resulting screen reader outputs can be recorded as audio signal outputs or some representation of text output (e.g., using a text-to-speech converter) recorded in a format such that a baseline-vs.-current difference test can be performed at a later point. Additionally, the recording functionality of the embodiments of the present invention allow multiple tests to be executed concurrently without running into resource contention, since analysis can be performed at a later time. The recording functionality allows portions of resulting screen reader outputs to be marked as variable for portions of output that are expected to differ on each test run (e.g., such as timestamps, etc.). Embodiments of the test input component and the test output component allow recordings to capture keystrokes, mouse clicks, etc., before they are sent to an application and played back to an application.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Figure 1:
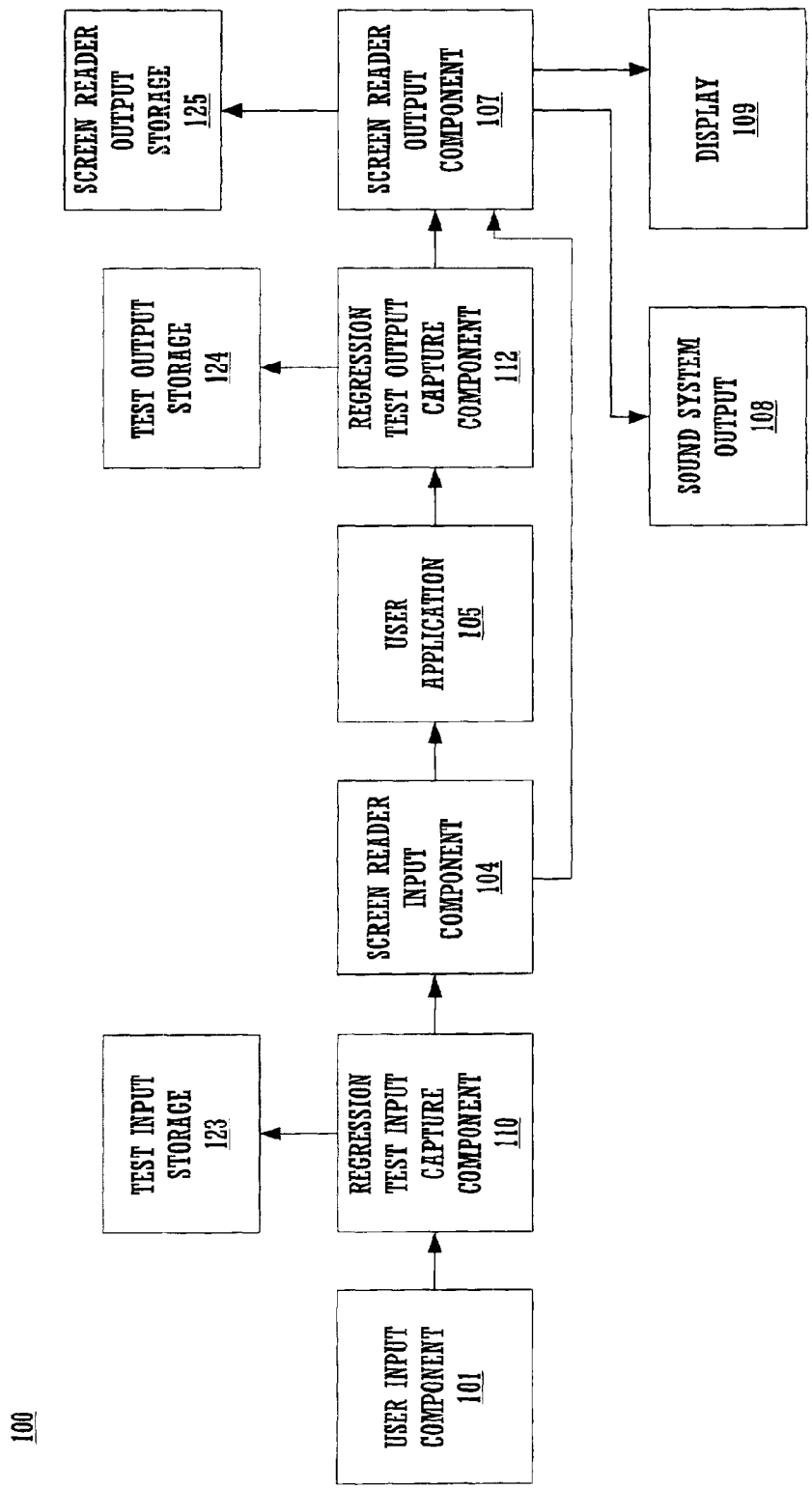
FIG. 1 shows an overview diagram of a screen reader regression testing system in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention comprise a method and system for automated screen reader regression testing. Embodiments of the present invention are configured to function with screen reader software applications. Additionally, embodiments of the present invention are configured to implement an automated screen reader regression testing system compatible with the audible results of a screen reader applications.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "igenerating" or "accessing" or "communicating" or "executing" or "displaying" or the like, refer to the action and processes of a computer system (e.g., computer system 412 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

FIG. 1 shows an overview diagram of a screen reader regression testing system 100 in accordance with one embodiment of the present invention. As depicted in FIG. 1, the testing system 100 includes a regression test input capture component 110, a regression test output capture component 112, test input storage 123, test output storage 124, and screen reader output storage 125. In this embodiment, the components 110, 112, and 123–125 implement the recording functionality of the regression testing system 100.

Referring to the system 100 embodiment, a user input component 101 is implemented to receive user input from user input devices, such as, for example, a keyboard, mouse, or the like. The user input is used to interact with a user application 105. The user application 105 can be a typical software application in accordance with any requirement or activity of the user (e.g., Web browser, word processor, or the like). Inputs to the user application 105 are received via the user input component 101. Outputs of the user application 105 are communicated to the user via a display 109 (e.g., monitor, Braille display, etc.) and/or speakers of the sound output system 108.

A screen reader input component 104 and a screen reader output component 107 are used to translate selected portions of the output of the user application 105 and user inputs received via the user input component 101 into audible speech rendered by the sound system output 108. System 100 functions in part by implementing an efficient testing system for debugging, regression testing, performance verification, etc., of the functions of a screen reader application.

The regression test input capture component 110 functions by accessing the user inputs received via the user input component 101 and recording the user inputs to the input storage 123. The user inputs are also received by the screen reader input component 104 and the user application 105. The user application 105 acts upon the received user inputs and generates the corresponding output functionality for communication to the user. This output functionality can be, as described above, graphical presentations or alphanumeric presentations for display 109 or audible sound output for sound system output 108.

The regression test output capture component 112 functions by accessing the output of the user application 105 and recording the output to test output storage 124. The output of the user application 105 is also received by the screen reader output component 107. In this embodiment, information from the user input received via the screen reader input component 104 and information from the output of the user application 105 received via the screen reader output component 107 are used to generate a resulting screen reader output that is provided to the sound system output 108 and subsequently rendered into audible text. This audible text is produced in conjunction with the display information presented on the display 109. In this embodiment, the resulting screen reader output is also stored to the screen reader output storage 125.

In this manner, the system 100 embodiment of the present invention allows for automated regression testing of a screen reader application. The functionality of a screen reader application can be tested by comparing a resulting screen reader output 125 against the test input storage 123 and the test output storage 124. Deviations from a nominal result indicated by the input storage 123 and the output storage 124 can be detected through comparison of a predicted, nominal result, with the actual result indicated by the screen reader output storage 125.

Referring still to the system 100 embodiment of FIG. 1, the storage functionality provided by components 123–125 enable the recording of test scripts (e.g., using the test input component) in a natural way for existing Quality Assurance engineers. The test scripts can be captured by the component storage 123 and 124 and the result of the test captured in output storage 125 for later analysis a convenient time. The resulting screen reader outputs 125 can be recorded as audio signal outputs or some representation of text output (e.g., using a text-to-speech converter) recorded in a format such that a baseline-vs.-current difference test can be performed at a later point, thereby implementing an efficient regression testing procedure. Additionally, the recording functionality of the embodiments of the present invention allow multiple tests to be executed concurrently without running into resource contention, since analysis can be performed at a later time.

Additionally, the recording functionality allows portions of resulting screen reader outputs 125 to be marked as variable for those portions of output that are expected to differ on each test run (e.g., such as timestamps, etc.). Embodiments of the regression test input component 110 and the regression test output component 112 allow recordings to capture keystrokes, mouse clicks, etc., before they are sent, to a screen reader application and played back to the screen reader application.

Figure 2:
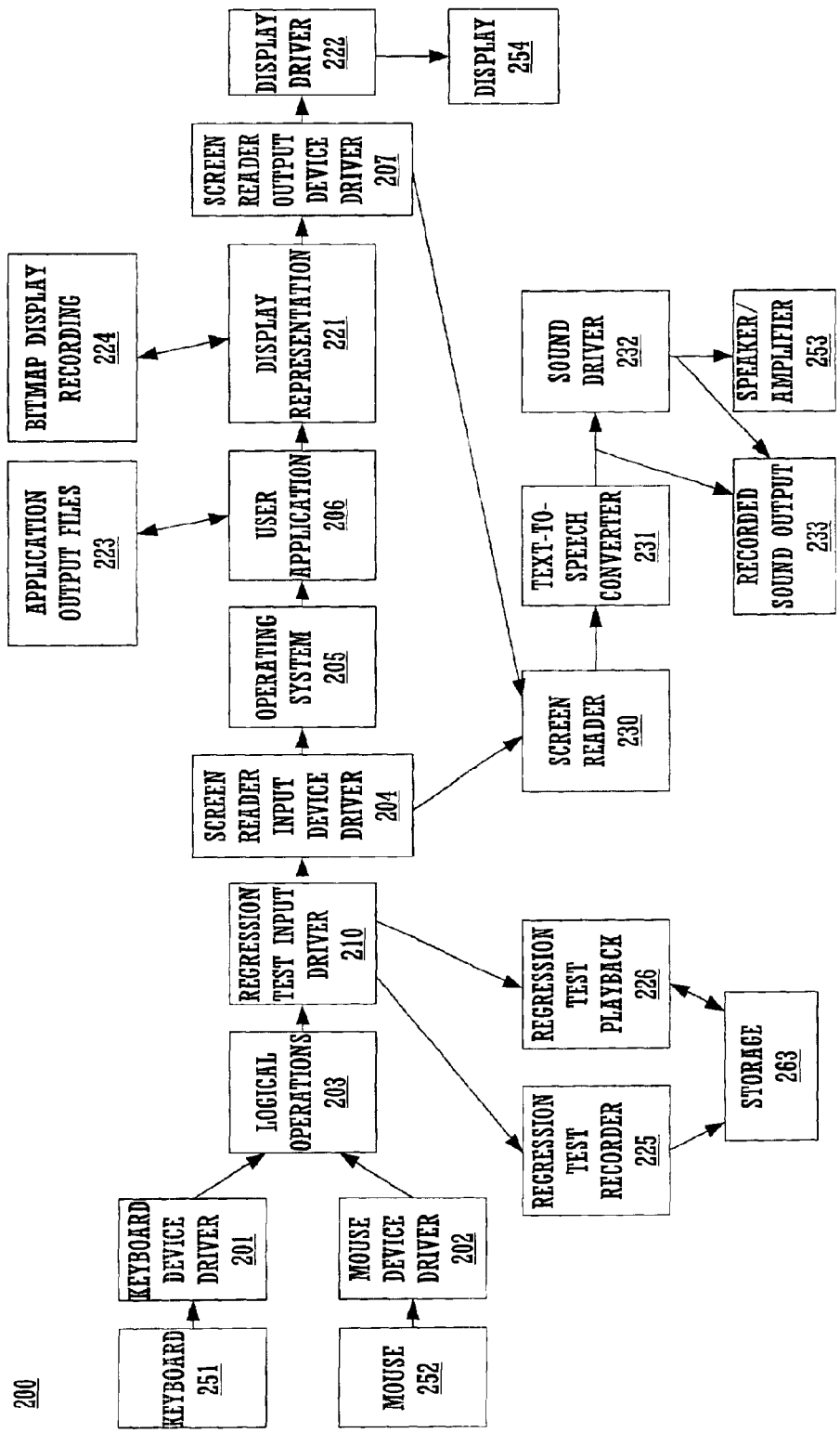
FIG. 2 shows a more detailed diagram of a screen reader regression testing system in accordance with another embodiment of the present invention.

FIG. 2 shows a more detailed diagram of a screen reader regression testing system 200 in accordance with another embodiment of the present invention. Testing system 200 shows a more detailed depiction of components of a screen reader regression testing system.

The system 200 embodiment shows a keyboard 251 and a mouse 252 respectively coupled to a keyboard device driver 201 and a mouse device driver 202, which render actuations of the keyboard and/or mouse into logical operations 203. The logical operations 203 are then accessed by a regression test input driver 210, a screen reader input device driver 204, and a user application 206 via the operating system 205. The logical operations 203 provide the same function as the information received from the user input component 101 of FIG. 1.

The logical operations 203 are recorded into storage 263 using a regression test recorder 225. To facilitate subsequent regression testing, the logical operations can be subsequently played back from storage 263 using a regression test playback component 226. The logical operations 203 are accessed and provided by the screen reader input device driver 204 to a screen reader application 230. The operating system 205 also provides the logical operations 203 to the user application 206, where they are used to generate a display representation 221 (e.g., graphical or alphanumeric representation for the display 254).

In this embodiment, the output of the user application 206 is stored as application output files 223 and the display representation 221 is stored as the bitmap display recording 224. The display representation 221 is also accessed by a screen reader output device driver 207 and a display driver 222. The display driver 222 provides the electronic signals required to drive images on to the display 254 (e.g., a CRT monitor, Braille display, etc.).

The logical operations provided by the screen reader input device driver 204 and the display representation provided by the screen reader output device driver 207 are used by the screen reader application 230 to generate information required to produce the audible text heard by the user. The screen reader 230 generates a resulting output and couples this output to a text-to-speech converter 231 which generates the audible text output via a sound driver 232 and coupled speaker(s)/amplifier 253. In this embodiment, the output of the text-to-speech converter 231 and/or signal provided to the speaker/amplifier 253 are recorded as a recorded sound output 233.

Thus, scripts for testing can be recorded using the regression test recorder 225 and subsequently played back for one or more test sessions using the regression test playback component 226. The recorded sound outputs 233 generated by the screen reader 230 are compared tested, and verified against the application output files 223 and the bitmap display recording 224. In one embodiment, the actual comparison, testing, and verification can be performed independent of any human operator, wherein, for example, differences between a predicted output and the actual output of the screen reader can be detected automatically and flagged by the computer system. The recording functionality of system 200 provides electronic files which record the inputs to the screen reader 230 and the outputs of the screen reader 230 and which can be accessed at later times to provide fill regression testing functions.

Figure 3:
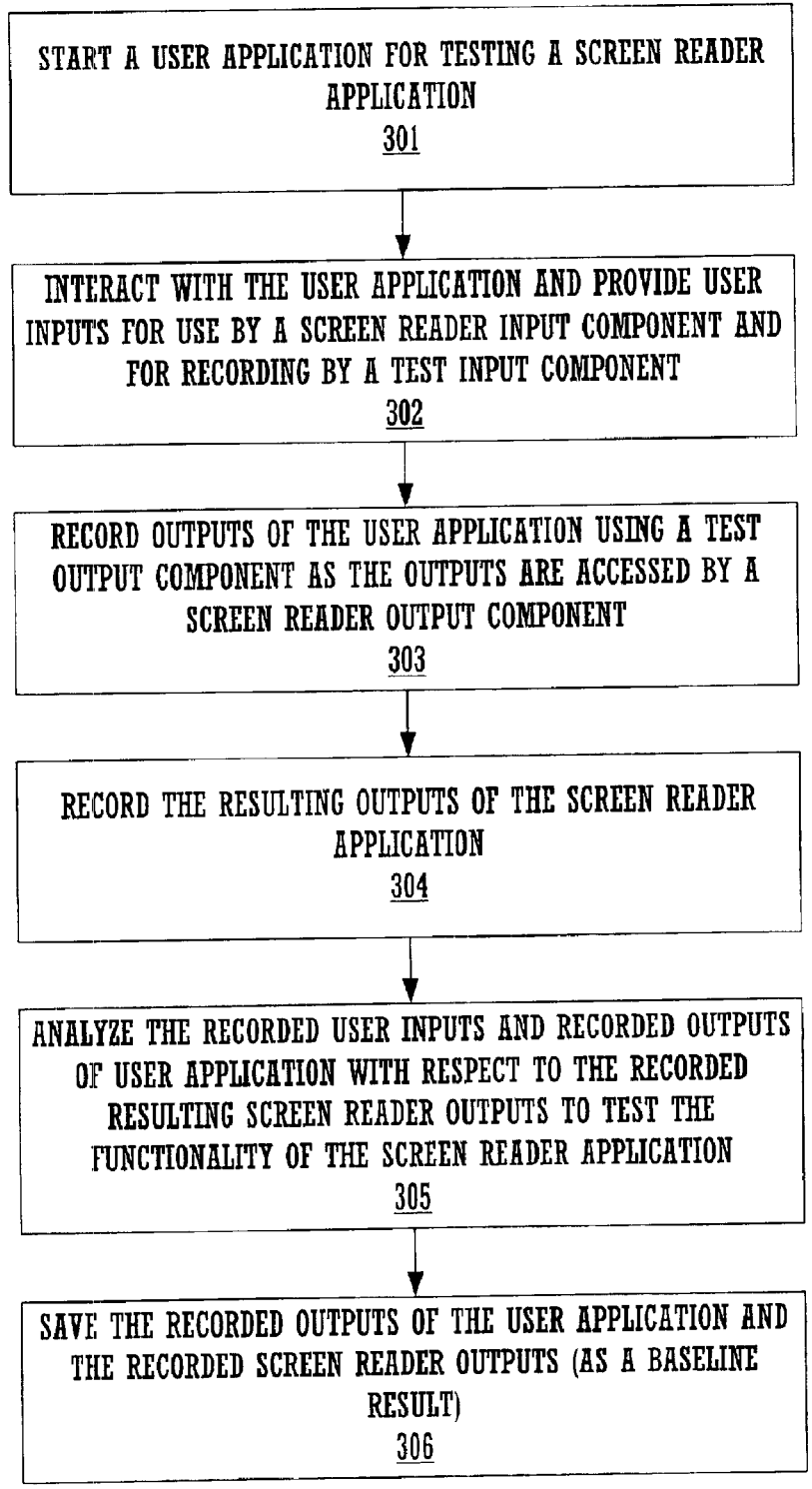
FIG. 3 shows a flowchart of the steps of a screen reader regression testing process in accordance with one embodiment of the present invention.

Referring now to FIG. 3, a flowchart of the steps of a screen reader testing process 300 in accordance with one embodiment of the present invention is shown. As depicted in FIG. 3, process 300 shows the basic steps of a screen reader testing system (e.g., system 100 of FIG. 1) in accordance with one embodiment of the present invention.

Process 300 begins in step 301 where a user starts a user application. In step 302, the user interacts with the user application (e.g., via keyboard, mouse, etc.) as user inputs are recorded using a test input component. As described above, the user inputs are also accessed by the screen reader input component of the screen reader application. In step 303, outputs of the user application are recorded using a test output component. These outputs are also accessed by a screen reader output component of the screen reader application. The user inputs and the user application outputs are used by the screen reader application to generate resulting screen reader outputs (e.g., audible text). In step 304, the resulting outputs of the screen reader are recorded. Subsequently, in step 305, the recorded user inputs and recorded outputs of the user application are analyzed with respect to the recorded resulting screen reader outputs in order to test the functionality of the screen reader. In step 306, if this is the first time through, the recorded outputs of the application and the recorded screen reader outputs are saved (as generated by the application and user inputs) as the baseline result set.

Computer System Platform

Figure 4:
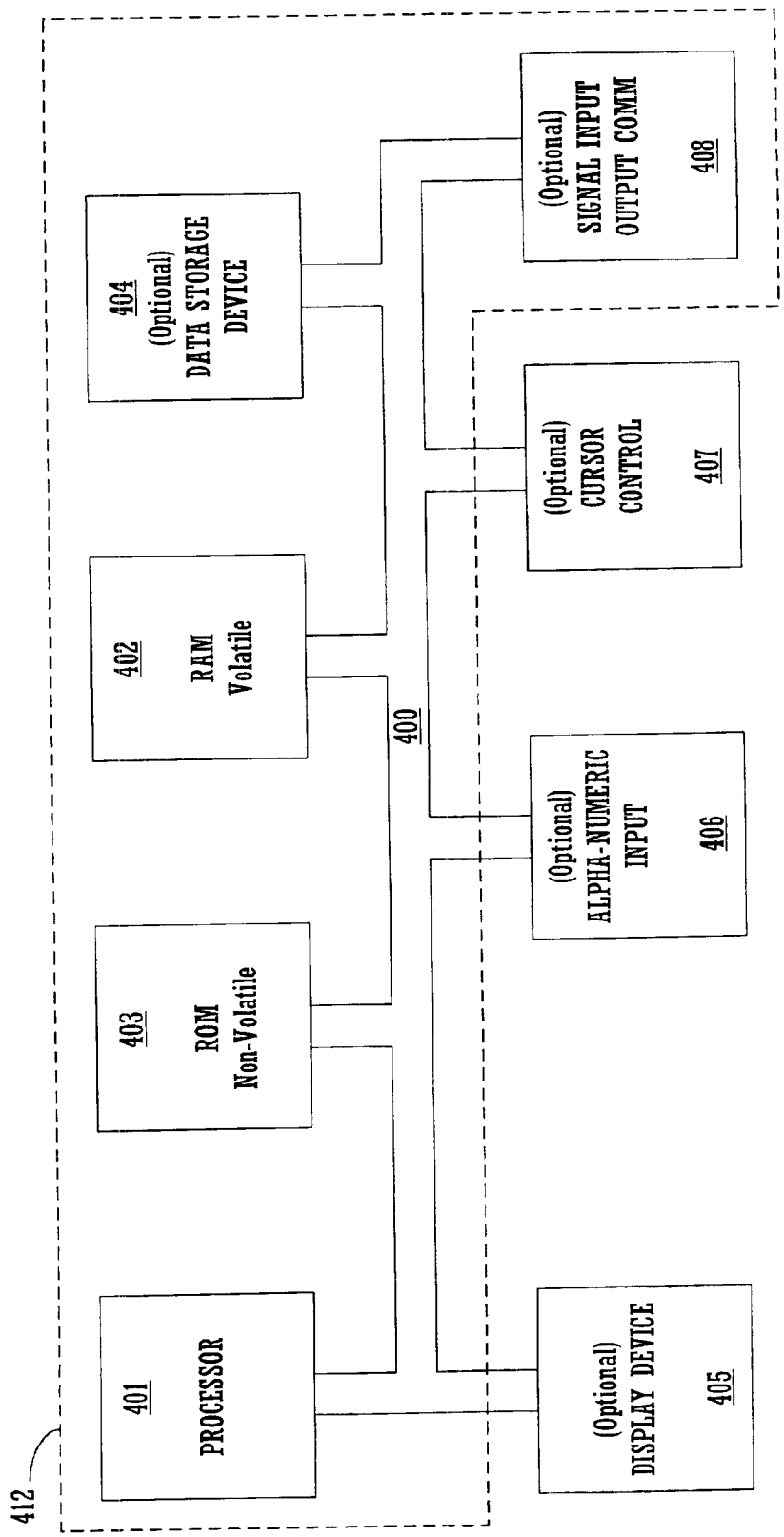
FIG. 4 shows the components of a computer system in accordance with one embodiment of the present invention.

With reference now to FIG. 4, a computer system 412 in accordance with one embodiment of the present invention is shown. Computer system 412 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 412) and are executed by the processor(s) of system 412. When executed, the instructions cause the computer system 412 to implement the functionality of the present invention as described above.

In general, computer system 412 comprises an address/data bus 400 for communicating information, one or more central processors 401 coupled with the bus 400 for processing information and instructions, a computer readable volatile memory unit 402 (e.g., random access memory, static RAM, dynamic, RAM, etc.) coupled with the bus 400 for storing information and instructions for the central processor(s) 401, a computer readable non-volatile memory unit (e.g., read only memory, programmable ROM, flash memory, EPROM, EEPROM, etc.) coupled with the bus 400 for storing static information and instructions for the processor(s) 401. System 412 also includes a mass storage computer readable data storage device 404 such as a magnetic or optical disk and disk drive coupled with the bus 400 for storing information and instructions. Optionally, system 412 can include a display device 405 coupled to the bus 400 for displaying information to the computer user, an alphanumeric input device 406 including alphanumeric and function keys coupled to the bus 400 for communicating information and command selections to the central processor(s) 401, a cursor control device 407 coupled to the bus for communicating user input information and command selections to the central processor(s) 401, and a signal generating device 408 coupled to the bus 400 for communicating command selections to the processor(s) 401.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method for screen reader testing, comprising:

recording user inputs to a user application using a test input component, the user inputs also accessed by a screen reader input component;

recording outputs of the user application using a test output component, the outputs of the user application also accessed by a screen reader output component;

recording resulting screen reader outputs; and analyzing the recorded user inputs and the recorded outputs of the user application with respect to the resulting screen reader outputs in order to test the resulting screen reader outputs.

2. The method of claim 1 wherein the user inputs to the user application comprise keyboard inputs or mouse inputs.

3. The method of claim 1 wherein the outputs of the user application comprise graphical outputs or alphanumeric outputs for a display of the computer system.

4. The method of claim 1 wherein the resulting screen reader output comprise sound output signals for a sound system of the computer system.

5. The method of claim 1 further comprising:

performing regression testing using the recorded user inputs and the recorded outputs of the user application with respect to the recorded resulting screen reader outputs.

6. A computer implemented system for screen reader testing, comprising:

a computer system having a processor coupled to a memory, the memory having computer readable code which when executed by the processor causes the computer system to implement:

a test input capture component configured for recording user inputs to a user application, the user inputs also accessed by a screen reader input component;

a test output capture component configured for recording outputs of the user application, the outputs of the user application also accessed by a screen reader output component; and a screen reader output storage component configured for recording resulting screen reader outputs, the recorded user inputs and the recorded outputs of the user application analyzed with respect to the resulting screen reader outputs in order to test the resulting screen reader outputs.

7. The system of claim 6 wherein the user inputs to the user application comprises keyboard inputs or mouse inputs.

8. The system of claim 6 wherein the outputs of the user application comprises graphical outputs or alphanumeric outputs for a display of the computer system.

9. The system of claim 6 wherein the resulting screen reader output comprises sound output signals for a sound system of the computer system.

10. The system of claim 6 further comprising:

performing regression testing using the recorded user inputs and the recorded outputs of the user application with respect to the recorded resulting screen reader outputs.

11. A computer readable media having computer readable code which when executed by a processor of a computer system causes the computer system to implement a method for screen reader testing, comprising:

recording user inputs to a user application using a test input component, the user inputs also accessed by a screen reader input component;

recording outputs of the user application using a test output component, the outputs of the user application also accessed by a screen reader output component;

recording resulting screen reader outputs; and analyzing the recorded user inputs and the recorded outputs of the user application with respect to the resulting screen reader outputs in order to test the resulting screen reader outputs.

12. The media of claim 11 wherein the user inputs to the user application comprises keyboard inputs or mouse inputs.

13. The media of claim 11 wherein the outputs of the user application comprises graphical outputs or alphanumeric outputs for a display of the computer system.

14. The media of claim 11 wherein the resulting screen reader output comprises sound output signals for a sound system of the computer system.

15. A computer implemented system for screen reader regression testing, comprising:

means for recording user inputs to a user application using a test input component, the user inputs also accessed by a screen reader input component;

means for recording outputs of the user application using a test output component, the outputs of the user application also accessed by a screen reader output component;

means for recording resulting screen reader outputs; and means for analyzing the recorded user inputs and the recorded outputs of the user application with respect to the resulting screen reader outputs in order to test the resulting screen reader outputs.

16. The system of claim 15 wherein the user inputs to the user application comprises keyboard inputs or mouse inputs.

17. The system of claim 15 wherein the outputs of the user application comprises graphical outputs or alphanumeric outputs for a display of the computer system.

18. The system of claim 15 wherein the resulting screen reader outputs comprise sound output signals for a sound system of the computer system.

19. The system of claim 15 wherein the resulting screen reader outputs comprise sound output signals of a sound driver of the computer system.

20. The system of claim 15 wherein the resulting screen reader outputs comprise outputs of a text to speech converter coupled to a sound driver of the computer system.

* * * * *